Dec. 2, 1958     L. E. ROBB     2,862,244
EXTRUSION MOLDING OF COPOLYMERS OF TRIFLUOROCHLOROETHYLENE
AND VINYLIDENE FLUORIDE
Filed Feb. 28, 1955
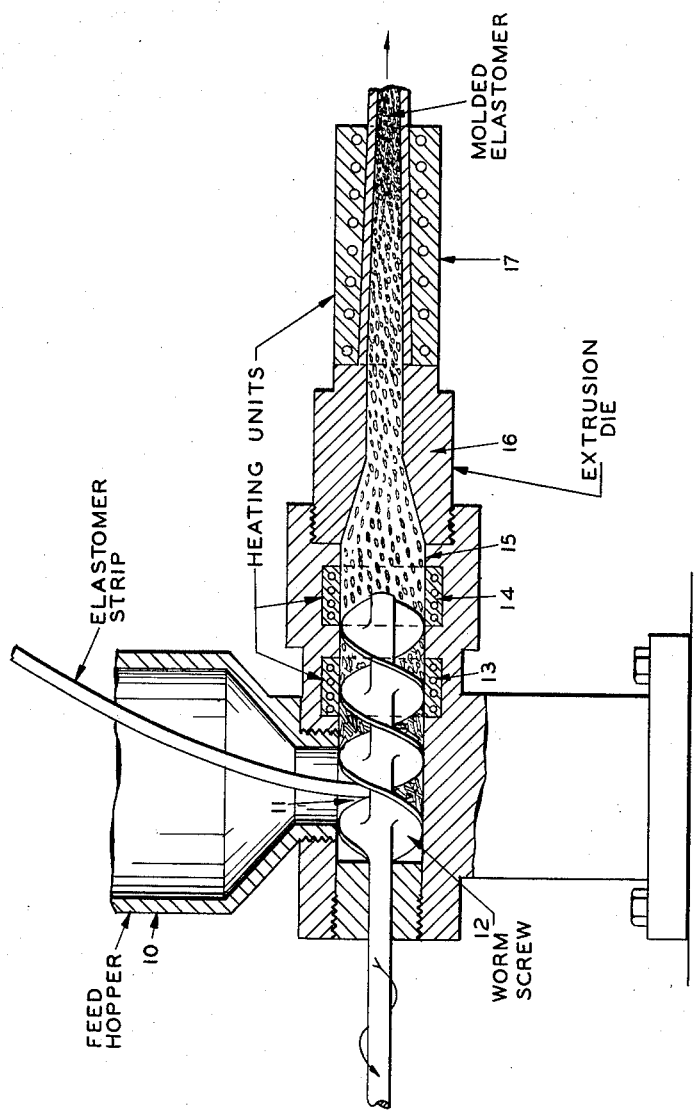
INVENTOR.
LESTER E. ROBB
BY  H. H. Palmer
    Benjamin J. Kaufman
    ATTORNEYS

United States Patent Office

2,862,244
Patented Dec. 2, 1958

2,862,244

EXTRUSION MOLDING OF COPOLYMERS OF TRIFLUOROCHLOROETHYLENE AND VINYLIDENE FLUORIDE

Lester E. Robb, Westfield, N. J., assignor, by mesne assignments, to Minnesota Mining and Manufacturing Company, St. Paul, Minn., a corporation of Delaware Application February 28, 1955, Serial No. 490,719

6 Claims. (Cl. 18—55)

This invention relates to, and has as an object, the extrusion molding of copolymers of trifluorochloroethylene and vinylidene fluoride. In one aspect, the invention relates to, and has as an object, the extrusion molding of elastomeric copolymers of trifluorochloroethylene and vinylidene fluoride. More particularly in this aspect, the invention relates to, and has as an object, the extrusion molding of elastomeric copolymers of trifluorochloroethylene and vinylidene fluoride for the purpose of forming useful articles of this material, and apparatus suitable for carrying out such extrusion molding.

Elastomeric copolymers of trifluorochloroethylene and vinylidene fluoride are found to possess a wide variety of commercial applications and utility. These elastomeric copolymers possess, in addition to good flexibility, resilence and elasticity, high tensile strength, hardness, and good resistance to heat. They exhibit good elastomeric properties and flexibility even when subjected to relatively low temperatures. These copolymers exhibit corrosion-resistance to hydrocarbon oils, fuels and various powerful reagents. In this respect, the copolymers are unaffected even after prolonged exposure to hydrofluoric acid, hydrochloric acid, and strong caustic solutions, as well as concentrated sulfuric acid, fuming nitric acid, aqua regia, and other vigorous oxidizing materials. The copolymer is not affected by water or by humidity, and in general is a highly efficient insulating material. In one of its preferred commercial applications, it is desirable to extrude this copolymer in the form of tubing, rods, wire coating, filaments, beading, films, ribbons, bands, and various other forms, in which insulation is required in the form of a material which exhibits good elastomeric properties together with high chemical and physical stability.

The elastomeric copolymers of trifluorochloroethylene and vinylidene fluoride, molded in accordance with this invention, contain between about 20 mole percent and about 69 mole percent of trifluorochloroethylene, and the remaining major constituent being vinylidene fluoride. In general, these copolymers are prepared by copolymerizing the trifluorochloroethylene monomer with the vinylidene fluoride monomer at temperatures between about −25° C. and about 50° C. in the presence of a polymerization catalyst, either as an inorganic promoter in the form of a water-suspension type recipe or as an organic peroxide promoter in mass or bulk-type polymerization. When the polymerization promoter is in the form of a water-suspension type recipe, the reaction is preferably carried out at a temperature between about 0° C. and about 35° C. When the polymerization promoter is an organic peroxide promoter in a mass polymerization system, the reaction is preferably carried out at a temperature between about −20° C. and about 0° C. Of the water-suspension recipe type catalysts, a redox catalyst system is preferred (having no emulsifier), and contains an oxidant, a reductant and a variable valence metal salt. The oxidant in the water-suspension type recipe is preferably an inorganic persulfate such as potassium persulfate, sodium persulfate or ammonium persulfate, the former being most desirable. The reductant is preferably a bisulfite such as sodium bisulfite or potassium bisulfite, and preferably the former. The variable valence metal salt, which is employed for the purpose of regenerating the oxidant, is preferably in the form of an iron salt such as ferrous sulfate or ferrous nitrate, with ferrous sulfate being the most desirable variable valence metal salt. Of the organic peroxide promoters, halogen-substituted acetyl peroxides are employed in carrying out the copolymerization reaction in the absence of a suspension agent. Trichloroacetyl peroxide is a preferred promoter of this type. Other halogen-substituted organic peroxides suitable for carrying out the copolymerization reaction are trifluoroacetyl peroxide, difluoroacetyl peroxide, 2,4-dichlorobenzoyl peroxide, chloroacetyl peroxide, trifluorodichloropropionyl peroxide, and dichlorofluoroacetyl peroxide.

As indicated above, the finished elastomeric copolymers of trifluorochloroethylene and vinylidene fluoride contain between about 20 mole percent and about 69 mole percent trifluorochloroethylene, with the remaining major constituent being vinylidene fluoride. If the finished elastomeric copolymer contains less than about 20 mole percent of the trifluorochloroethylene monomer, the copolymer exhibits a tendency to lose the aforementioned desirable properties of corrosion-resistance to hydrocarbon oils, fuels, and other powerful reagents, due to the high increase in the vinylidene fluoride content. If on the other hand, the finished copolymer contains more than about 69 mole percent of the trifluorochloroethylene monomer, the copolymer exhibits stiffness and reduced flexibility and thus loses its desirable elastomeric properties. Within this critical range it is preferred that the finished elastomeric copolymers contain between about 25 mole percent and about 50 mole percent of the trifluorochloroethylene monomer, with the vinylidene fluoride monomer constituting the remaining major constituent.

In order to produce the aforementioned elastomeric copolymers of trifluorochloroethylene and vinylidene fluoride, a proper feed must be selected for the preparation of a finished copolymer of desired composition, having between about 20 mole percent and about 69 mole percent of trifluorochloroethylene, with the remaining major constituent being vinylidene fluoride. For this purpose, monomer reactivity ratios for trifluorochloroethylene and vinylidene fluoride are calculated in accordance with the Mayo, Lewis and Walling equation [1], which together with specific operating conditions for carrying out the polymerization to produce the above-mentioned finished elastomeric copolymers of trifluorochloroethylene and vinylidene fluoride, are fully described in application S. N. 332,218, filed January 21, 1953, in the name of Albert L. Dittman, Herbert J. Passino, and Wilber O. Teeters, now Patent No. 2,752,331, and is therefore believed to require no further elaboration insofar as the purposes of this invention are concerned. In general, however, it is found that the feed composition will comprise between about 5 mole percent and about 75 mole percent of trifluorochloroethylene with the remainder of the copolymer feed being made up of vinylidene fluoride, to produce an elastomeric copolymer comprising between about 20 mole percent and about 69 mole percent of trifluorochloroethylene. To produce an elastomeric copolymer within the preferred range, in which the trifluorochloroethylene is present in an amount between about 25 mole percent and about 50 mole percent, the feed composition will comprise between about 7 mole ---
[1] Reference: "Copolymerization," F. R. Mayo and Cheves, Walling Chemical Reviews, vol. 46, pages 195–7.

percent and about 40 mole percent of trifluorochloroethylene, with the remaining major constituent being vinylidene fluoride.

The aforementioned elastomeric copolymers of trifluorochloroethylene and vinylidene fluoride, with which the process of the present invention is concerned, are obtained from the polymerization reactor or bomb in the form of chunks of rubbery polymer in admixture with water. These chunks are separated from the water; and then are next separately washed with hot water to remove residual salts, followed by drying in vacuo at a temperature between about 20° C. and about 35° C. The finished elastomeric copolymer is thus obtained as a white spongy crumb or gum.

The aforementioned crumb of the elastomeric copolymer of trifluorochloroethylene and vinylidene fluoride has been found, through X-ray analysis, to be amorphous at temperatures as low as −40° C. Upon being subjected to stretching up to 300%, typical fiber diagrams are observed indicating susceptibility to orientation and crystal formation. The high thermal stability of the elastomeric copolymer, is apparent from the fact that there is no evidence of chain scission or halogen loss after prolonged exposure at 400° F. The specific gravity of this elastomeric gum is approximately 1.85. It is readily soluble in ketones, esters, and cyclic ethers; but insoluble in alcohols, and aliphatic, aromatic, and chlorinated hydrocarbons. The uncured elastomer is found to have a durometer hardness of 45A–50A, and possesses an excellent storage life. Samples, exposed to strong ultraviolet light for 100 hours and stored at room temperature for more than a year, have exhibited no apparent change in properties. In carrying out the extrusion molding of the aforementioned elastomeric copolymers of trifluorochloroethylene and vinylidene fluoride, in accordance with the process of the present invention, specific operating conditions and handling technique are necessitated to produce finished extruded articles possessing the aforementioned desired properties.

In accordance with the process of the present invention, the elastomeric copolymer of trifluorochloroethylene and vinylidene fluoride is subjected to the extrusion molding cycle starting with either an unvulcanized raw rubbery crumb or gum; or starting with this raw rubbery material, having employed therein, suitable vulcanizing agents, as more fully hereinafter discussed. The extrusion molding of this material, however, cannot be carried out when starting with the copolymeric material already in a vulcanized state. In those instances in which it is desired to produce a finished vulcanized elastomeric copolymer of trifluorochloroethylene and vinylidene fluoride, suitable vulcanizing agents are impregnated in the raw rubbery crumb, employing a conventional two-roll mill, maintained at a temperature between about 125° F. and about 170° F. to produce a compounded uncured stock comprising a coherent high-density thin sheet of gum, usually from 20 to 40 mils in thickness. This sheet is then cut into narrow strips suitable for introduction into the feed hopper of the extrusion molding apparatus.

In carrying out the extrusion molding cycle of the above-mentioned elastomeric copolymeric material of trifluorochloroethylene and vinylidene fluoride, employing either an unvulcanized raw rubbery crumb, or a compounded uncured stock which contains the vulcanizing agent, as indicated above, recognition of the transition temperature of this material, must be taken into consideration in order to accomplish proper extrusion thereof, into the various forms of articles that can be fabricated by this type of molding. This elastomeric copolymer is found to have a transition temperature varying between about 170° F. and about 190° F. This transition is characterized by a change taking place wherein the copolymeric material passes from an elastic to an inelastic or powdery state.

The aforementioned transition temperature of the elastomeric copolymer can be best described as being in the nature of a physical transition temperature range, as distinguished from any physical-chemical property. The elastomeric copolymer, when undergoing a shearing stress within the aforementioned transition temperature range, changes physical form at the interface where the shearing stress is at a maximum. This change from the aforementioned elastic to an inelastic or powdery state, occurs at the surface of the extruded polymer, when temperatures are maintained within the aforementioned transition temperature range. The same phenomena are observed in milling operations when both shear stress, and the aforementioned transition temperatures, are present. The above changes in the condition of the elastomeric material are of a reversible nature. The powdery material can be banded on the mill at lower temperatures (e. g., 100–120° F.) to produce an elastic or rubbery gum sheet. On the other hand, a piece of rubbery gum resting in the oven within the aforementioned transition temperature range (170–190° F.), i. e., in the absence of applied stress, will not show such change. The aforementioned transition temperature range of the elastomeric copolymers of the present invention, in being described as a physical transition temperature range, will serve to distinguish this phenomenon from elastomeric materials having first and second order transition temperatures, which are true thermodynamic values.

In view of this change taking place during the processing of the copolymeric material within this temperature range, it will, therefore, be apparent why it is important, if any vulcanizing agents are to be added to the raw copolymeric material, that the vulcanizing agents should preferably be impregnated into the raw rubbery crumb at the aforementioned temperature between about 125° F. and about 170° F. In view of the nature of the transition temperature of this material, during any heating operation, proper conditions must be maintained within the chamber and the die of the extrusion apparatus employed in carrying out the molding cycle.

The extrusion chamber, or cylinder into which the copolymeric material is introduced from the feed hopper, is normally maintained at a temperature which is below the aforementioned uppermost limit of the transition temperature, namely, 190° F., and preferably not higher than about 170° F. In general, within this extrusion chamber or cylinder, the copolymeric material is heated and maintained at a temperature between about 70° F. and about 170° F. Optimum results have been found to be obtained, when this chamber is maintained at a temperature within the range between about 100° F. and about 140° F. By maintaining the copolymeric material within the ranges indicated above, the material is placed into a plastic moldable condition, suitable for subsequent extrusion.

In this respect, it should also be noted that although, as indicated above, a temperature above the transition temperature (namely, between about 170° F. and about 190° F.) results in the copolymeric material passing from an elastic to a powdery state; nevertheless, the temperature within the extrusion chamber may be raised to any temperature which is below the temperature of substantial decomposition of the material itself. This temperature is approximately 450° F. Normally, however, it is not desirable to employ temperatures appreciably above the uppermost limit of the transition temperature range, viz., 190° F. If the temperature within the extrusion chamber is maintined above the uppermost limit of the transition temperature (i. e., 170–190° F.) and below the temperature of substantial decomposition (i. e., approximately 450° F.), although the molding cycle may be completed and a finished fabricated article can subsequently be obtained through the extrusion die, it will be found, however, that this molded article is not comprised of the copolymeric material in a consolidated state; but, rather, possesses an unpolished surface which is filled with powdered masses of the copolymeric material, probably due to orientation taking place within the molding apparatus at such elevated temperatures. Thus in most instances, where a smooth, uniform and polished surface is desired, temperatures within the extrusion chamber appreciably above the transition temperature range are not recommeneded.

The softened copolymeric material, which is now in a plastic moldable condition is next passed through the heated extrusion chamber or cylinder into the entrance section of the extrusion die. The land or straight exit portion of the extrusion die is normally maintained at a temperature between about 70° F. and not higher than the uppermost limit of the transition temperature range. Optimum results have been found to be obtained, when the die is maintained within a range close to the upper portion of the aforementioned transition temperature range. In this respect, temperatures between about 140° F. and not higher than the uppermost limit of the transition temperature range (i. e., 170–190° F.) have been found to be most desirable. In general, temperatures are preferred in the die land which are higher than those maintained within the extrusion chamber in order to obtain maximum free-flow and a highly polished profile. It should be noted, however, as indicated above, that it is possible, here also to maintain an elevated temperature within the die, which is above the transition temperature of the elastomeric material (viz., between about 170° F. and about 190° F.) but below the temperature of substantial decomposition of the material itself, viz., approximately 450° F. As previously indicated, however, it is not desirable to employ temperatures appreciably above the uppermost limit of the transition temperature range, viz., 190° F., since an unpolished surface will be obtained in the finished molded article which is filled with powdered masses of the copolymeric material. The extruded material is next passed from the exit portion of the die, and is preferably immersed in water to undergo cooling, and is then ready for subsequent handling. In this respect, it should be noted that the aforementioned cooling of this elastomeric material is not in the nature of a quenching operation (as may be applicable to treatment of various other forms of molded elastomeric materials), since during such cooling treatment the heated extruded article does not pass from an amorphous to a crystalline state.

As previously indicated, the extrusion molding of the elastomeric copolymers of this invention, is preferably, carried out with a compounded uncured stock, containing suitable vulcanizing agents impregnated in the raw rubbery crumb. The compounding of this elastomeric material, as previously indicated, employing a conventional two-roll mill, is carried out by banding the raw rubbery crumb or gum on the rolls which are heated to the aforementioned temperature, viz., between about 125° F. and about 170° F. Once the rubbery material has banded, the heat of milling is sufficient to maintain the bands, and the rolls are then cooled so that scorching is avoided as the vulcanizing or curing agents are added. Unlike unsaturated hydrocarbon rubbers, this elastomeric material does not show any appreciable breakdown during the milling operation.

When starting with a compounded stock containing suitable vulcanizing agents, the vulcanization treatment itself, is initiated and partially completed within the extrusion molding apparatus. Final vulcanization is carried out outside the molding apparatus (after the extrusion molding cycle has been completed), in suitable apparatus such as an oven or in an autoclave under steam pressure at temperatures between about 185° F. and about 300° F., depending upon the vulcanizing agents employed. Inasmuch as this elastomeric copolymer is a fully saturated fluorocarbon, it is not readily vulcanized by normal rubber curatives. However, this copolymer can be vulcanized employing organic peroxides, polyisocyanates, polyamines, and isocyanate-amine combinations. The marked increase in the strength and solvent resistance of the finished molded elastomeric copolymer, after vulcanization has taken place, is found to indicate that the elastomer has undergone a chemical change, producing a network or cross-linked type of structures. In Table I are shown the properties of the uncured elastomeric gum. In Table II is shown a comparison of finished, vulcanized elastomeric copolymers of the present invention when employing various curing systems.

TABLE I

*Properties of uncured elastomer gum*

| | |
|---|---|
| Specific gravity | 1.85. |
| Fluorine content | >50%. |
| Color | Translucent off-white. |
| Tensile, p. s. i | 300–600. |
| Elongation, percent | 600–800. |
| Shore A hardness | 40–45. |
| Intrinsic viscosity (methyl ethyl ketone 30° C.) | 2–3. |
| Solubility | Ketones, esters, ethers. |
| Storage | >two years (unchanged). |

TABLE II

*Comparison of curing systems for elastomer*

| Curative Type Stock | Peroxide | Amine | MDI | MDI-Amine | |
|---|---|---|---|---|---|
| Compound: | | | | | |
| Elastomer | 100 | 100 | 100 | 100 | 100 |
| Zinc Oxide | 10 | 5 | 5 | 5 | 5 |
| Benzoyl Peroxide | 3 | | | | |
| MDI [1] | | | 5 | 5 | 5 |
| Tetraethylene Pentamine | | 6 | | | 1 |
| Trimene Base [2] | | | | 3 | |
| Press Cure: | | | | | |
| Time, hours | ½ | 1 | 1 | 1 | 1 |
| Temperature, °F | 230 | 260 | 260 | 260 | 260 |
| Oven Cure: | | | | | |
| Time, hours | 16 | 1 | 72 | 16 | 16 |
| Temperature, °F | 300 | 300 | 212 | 212 | 212 |
| Physical Properties: | | | | | |
| After Press Cure— | | | | | |
| Stress at 300% E, p. s. i | 200 | 530 | 400 | 760 | |
| Tensile Strength, p. s. i | 350 | 1,280 | 530 | 1,590 | |
| Percent Elongation | 750 | 600 | 350 | 400 | |
| Hardness, Shore A | 40 | 48 | 53 | 50 | |
| After Oven Cure— | | | | | |
| Stress at 300% E, p. s. i | 530 | 1,020 | 590 | 1,170 | 630 |
| Tensile Strength, p. s. i | 350 | 1,620 | 800 | 1,460 | 1,250 |
| Percent Elongation | 500 | 450 | 320 | 400 | 580 |
| Hardness, Shore A | 47 | 55 | 61 | 58 | 60 |
| Tear Strength, p. p. i | | | 43 | 53 | |

[1] Methylene bis (4-phenyl isocyanate).
[2] Cyclic secondary amine (Naugatuck Chemical Company).

Of the organic peroxides which have been employed to vulcanize the raw elastomeric copolymer, benzoyl peroxide has been found to be the most convenient curing agent. It is easily dispersed in the rubbery material and is found to react efficiently at the aforementioned molding temperatures. The optimum range of the benzoyl peroxide concentration is between about 1.5 to about 3.0 parts per 100 parts of raw elastomeric copolymer, by weight. Metallic oxides, such as those of zinc, calcium, lead, and lead salts, such as dibasic lead phosphite, tribasic lead maleate, and tribasic lead sulfate, may be employed as stabilizers or accelerators in the benzoyl peroxide curing treatment to improve and maintain the physical properties of the vulcanizate. At the aforementioned peroxide levels the optimum concentrations of both metal oxides and lead salts are 5 to 10 parts per 100 parts of elastomeric copolymer.

Extensive experimentation with elastomeric copolymer stocks when compounded with zinc oxide, shows that these stocks possess high initial tensile strength and good aging properties at both normal and elevated temperatures. Magnesium and calcium oxides have also been found to impart high tensile strength, but tend to increase the water absorption characteristics of the elastomeric material. Lead oxide stocks are characterized by lower moduli and higher elongations. The effects of incorporating various metal oxides and lead salts in the benzoyl peroxide compounds are shown in Table III.

TABLE III

*Effect of metal oxide variation and basic lead salts on peroxide cured elastomer*

| Run Number | 1 | 2 | 3 | 4 | 5 | 6 |
|---|---|---|---|---|---|---|
| Compound: | | | | | | |
| Elastomer | 100 | 100 | 100 | 100 | 100 | 100 |
| Zinc Oxide | 10 | 10 | | | 10 | 10 |
| Litharge | | | 10 | | | |
| Calcium Oxide | | | | 10 | | |
| Benzoyl Peroxide | 3 | 3 | 3 | 3 | 3 | 3 |
| Dibasic Lead Phosphite | | 10 | 10 | 10 | | |
| Tribasic Lead Phosphite | | | | | 10 | |
| Tribasic Lead Maleate | | | | | | 10 |
| Press Cure: | | | | | | |
| Time, hours | ½ | ½ | ½ | ½ | ½ | ½ |
| Temperature, °F | 230 | 230 | 230 | 230 | 230 | 230 |
| Oven Cure: | | | | | | |
| Time, hours | 16 | 16 | 16 | 16 | 16 | 16 |
| Temperature, °F | 300 | 300 | 300 | 300 | 300 | 300 |
| Physical Properties: | | | | | | |
| After Press Cure— | | | | | | |
| Stress at 300% E, p. s. i | 200 | 450 | 340 | 380 | 505 | 375 |
| Tensile Strength, p. s. i | 350 | 920 | 640 | 715 | 1,040 | 690 |
| Percent Elongation | 750 | 450 | 600 | 550 | 450 | 500 |
| Hardness, Shore A | 40 | 45 | 42 | 45 | 47 | 42 |
| After Oven Cure— | | | | | | |
| Stress at 300% E, p. s. i | 530 | 660 | 435 | 760 | 685 | 490 |
| Tensile Strength, p. s. i | 1,350 | 2,500 | 2,200 | 2,180 | 2,120 | 2,400 |
| Percent Elongation | 500 | 500 | 650 | 475 | 500 | 550 |
| Hardness, Shore A | 47 | 51 | 48 | 47 | 52 | 47 |
| Tear Strength, p. p. i | | 123 | 141 | | | |

To preclude blowing or out-gassing in molded articles having thicknesses greater than about 75 mils, it is preferred to lower the peroxide concentration to about 1.5 parts per 100 parts of elastomeric copolymer. This reduction in the quantity of peroxide employed does not appreciably change the physical properties of the stock. An example of such a compound is one containing 10 parts of zinc oxide, 10 parts of diabasic lead phosphite, and 1.5 parts of benzoyl peroxide per 100 parts of raw elastomeric gum. The peroxide stocks are smooth, pliable, soft, easily processed and flow well in the mold. These stocks, when subsequently cured, have excellent physical properties and possess maximum resistance to oxidative chemical attack.

Of the amines which have been employed to vulcanize the raw elastomeric copolymer, strongly basic primary and secondary aliphatic polyamides have been found most effective. In this respect, triethylene tetramine, tetraethylene pentamine, trimene base, and hexamethylene diamine impart the highest tensile strength. The optimum amine concentrations are 1½ to 6 parts of amine per 100 parts of raw elastomeric gum. The fresh tensile strengths of amine stocks vary directly with the amine concentration; however, high amine loadings result in stocks which tend to become short after prolonged high temperature aging.

The amine stocks tend to scorch when processed on a hot two-roll mill; however, scorching can be controlled by introducing the amine in the form of an amine salt, such as hexamethylene diamine diacetate. The amine stocks are capable of being cured in a shorter period of time than other raw elastomeric stocks of the copolymers of the present invention. The recommended curing cycle is one hour in the press at about 260° F., followed by a one hour after-cure in the oven at 300° F. The primary advantage of amine stocks is that, unlike the aforementioned peroxide stocks, they can be plasticized effectively with commercial plasticizers. It has been found that these plasticized amine stocks are more resilient and have better compression set and low temperature properties than other raw elastomeric stocks of the copolymers of the present invention.

With respect to the polyisocyanates, that may be employed as vulcanizing agents incorporated in the raw elastomeric copolymers of the present invention, such compounds may be employed as methylene bis(4-phenyl isocyanate), supra, toluene 2,4-diisocyanate, and methane tri-(4-phenyl isocyanate). Metal oxides are employed to accelerate this type of cure. Concentrations of 5 to 10 parts of isocyanate and 5 to 10 parts of metal oxide per 100 parts of raw elastomeric copolymer are preferred.

The subsequent and final vulcanization treatment of these stocks, following the extrusion molding cycle, is preferably carried out at about 212° F. for a period of about 32 to 72 hours. Under these conditions, the initial tensile strengths of the isocyanate vulcanizates are low but tend to improve on aging. In general, the isocyanate cured stocks are stiffer, shorter, and less acid-resistant than peroxide cured stocks. The isocyanate stocks have been found to be more resistant to low hydrocarbon oils than the peroxide cured stocks. To improve the rate and extent of isocyanate vulcanization, 1 to 3 parts of various amines such as trimene base, and tetraethylene pentamine, may be added to stocks which contain five parts of polyisocyanate. Although these stocks, like the isocyanate stocks, are stiffer and less acid-resistant, they are more resistant to hydrocarbon oils than peroxide cured vulcanizates.

As previously indicated, the extruded vulcanizates of the elastomeric copolymers of the present invention possess high tensile strength and good extensibility. These properties, however, may be improved by the incorporation of various fillers. The effects of adding two such fillers, viz., precipitated silica and silicone coated silica, to peroxide and MDI-amine compounds are shown in Table IV.

TABLE IV

*Comparison between filled and unfilled elastomer vulcanizates*

| Run Number | 1 | 2 | 3 | 4 | 5 | 6 |
|---|---|---|---|---|---|---|
| Compound: | | | | | | |
| Elastomer | 100 | 100 | 100 | 100 | 100 | 100 |
| Zinc Oxide | 5 | 5 | 5 | 10 | 10 | 10 |
| MDI | 5 | 5 | 5 | | | |
| Tetraethylene Tetramine | 1 | 1 | 1 | | | |
| Benzoyl Peroxide | | | | 3 | 3 | 3 |
| Dibasic Lead Phosphite | | | | 10 | 10 | 10 |
| Precipitated Silica | | 20 | | | 20 | |
| Silicone Coated Precipitated Silica | | | 20 | | | 20 |
| Press Cure: | | | | | | |
| Time, hours | 1 | 1 | 1 | ½ | ½ | ½ |
| Temperature, °F | 260 | 260 | 260 | 230 | 230 | 230 |
| Oven Cure: | | | | | | |
| Time, hours | 16 | 16 | 16 | 16 | 16 | 16 |
| Temperature, °F | 212 | 212 | 212 | 300 | 300 | 300 |
| Physical Properties: | | | | | | |
| Stress at 300% E, p. s. i | 1,350 | 2,200 | 2,500 | 660 | 1,230 | 1,620 |
| Tensile Strength, p. s. i | 1,700 | 2,400 | 2,500 | 2,000 | 1,880 | 3,600 |
| Percent Elongation | 300 | 330 | 310 | 500 | 525 | 450 |
| Hardness, Shore A | 55 | 78 | 77 | 48 | 70 | 73 |
| Tear Strength, p. p. i | | 135 | 160 | 123 | | 204 |

In general, precipitated silicas increase the modulus and hardness without appreciably affecting the ultimate tensile strength or elongation of the peroxide cured stocks. The same fillers, e. g., precipitated silica, coated with a linear silicone polymer markedly increases both the tensile strength and tear strength of peroxide vulcanizates without changing elongation characteristics. It is believed that this high reinforcement results from cross-linking the silicone polymer to the fluorocarbon polymer.

The physical properties observed for a group of filled peroxide stocks are shown in Table V.

TABLE V

*Filled elastomer*

| Run Number | 1 | 2 | 3 | 4 | 5 |
|---|---|---|---|---|---|
| Elastomer | 100 | 100 | 100 | 100 | 100 |
| Zinc Oxide | 10 | 10 | 10 | 10 | 10 |
| Dibasic Lead Phosphite | 10 | 10 | 10 | 10 | 10 |
| Benzoyl Peroxide | 3 | 3 | 3 | 3 | 3 |
| Precipitated Silica | 20 | | | | |
| Silicone coated Precipitated Silica | | 20 | | | |
| Refined Silica | | | 20 | | |
| Zirconium Silicate | | | | 20 | |
| Carbon Black | | | | | 20 |
| Cure: | | | | | |
| Press—½ hr./230° F. | | | | | |
| Oven—16 hr./300° F. | | | | | |
| Stress at 300%, p. s. i. | 1,230 | 1,620 | 1,200 | 800 | 290 |
| Tensile, p. s. i. | 1,880 | 3,600 | 2,700 | 2,510 | 420 |
| Elongation, Percent | 525 | 450 | 660 | 700 | 450 |
| Shore A Hardness | 70 | 73 | 75 | 60 | 69 |

Various plasticizers may be incorporated in any of the aforementioned amine and amine-isocyanate stocks of the elastomeric copolymers of the present invention, such as di-isooctyl sebacate. Such stocks have been found softer, more resilient, and possess better low temperature and compression set properties than unplasticized stocks. In corporation of these plasticizers, however, in peroxide compounds, may result in blowing of the stock during the subsequent curing treatment. It has also been found that low molecular weight polyisobutylene is compatible in peroxide compounds and produces stocks which are softer, tackier, and possess good tensile properties. It should also be noted that it is possible to effect extrusion molding of the elastomeric copolymer, when blended with various other types of vulcanizing agents, such as Hevea, GR–S, GR–N, Neoprene (polychloroprene), Hypalon (chlorosulfonated polyethylene), butyl and silicone rubbers.

The accompanying drawing is an elevational view, partly in cross-section, showing an example of an extrusion machine for carrying out the extrusion molding of the aforementioned elastomeric copolymeric materials of trifluorochloroethylene and vinylidene fluoride, employing either a raw rubbery crumb, or a compounded uncured stock containing a vulcanizing agent, in accordance with the process of the present invention. It should be noted that the arrangement for heating the apparatus, at the various points indicated, may be modified if so desired, to provide varying temperatures and application of heat at additional points. In order to obtain the best results, the extrusion machine should be provided with adequate temperature control equipment, particularly where temperatures in the higher regions of the stated ranges are employed in carrying out the extrusion molding operation. The following example will serve to illustrate a typical extrusion molding cycle, in accordance with the process of the present invention, employing a compounded uncured stock, containing suitable vulcanizing agents impregnated in the raw rubbery crumb. It should be noted, however, that the same procedure may also be carried out employing a raw rubbery crumb free of any vulcanizing agents, if so desired.

A raw rubbery copolymeric crumb comprising about 50 mole percent of trifluorochloroethylene and about 50 mole percent of vinylidene fluoride is impregnated with 10 parts zinc oxide, 10 parts dibasic lead phosphite and 3 parts benzoyl peroxide per 100 parts of raw rubbery copolymeric crumb, employing a conventional two-roll mill maintained at a temperature of about 130° F., to obtain a compounded uncured stock comprising a high density sheet of about 35 mils in thickness. This sheet is then cut into elongated narrow strips, approximately ¾ inch in width and 18 inches in length. These strips of uncured stock, are next fed into feed hopper 10, which opens into the extrusion chamber or cylinder 11. Chamber 11 is provided with a worm screw 12. This worm screw is so designed that the molding material will pass through the extrusion chamber in a rather thin layer.

The extrusion chamber 11 is provided with suitable heating means for maintaining proper operating temperatures for molding the elastomeric copolymer within this chamber. For this purpose, a single heating element may be employed for the entire extrusion chamber or cylinder. However, two or more heating elements, viz., 13 and 14, are preferred, since this arrangement permits more gradual heating and shorter exposure to high temperatures. By means of these heating elements or units 13 and 14, the temperature of the elastomeric material in the extrusion chamber is adjusted to a temperature between about 70° F. and below the transition temperature (i. e., 170–190° F.). In this respect, it should be noted that the temperature of the elastomeric material is fairly uniform throughout and approaches the temperature of the cylinder wall 15 within a few degrees, since the material is in contact with the cylinder wall for a relatively longer period of time in comparison with the time of passage through the extrusion die 16 itself.

The heated elastomeric copolymeric material, which is now in a moldable condition, is next passed into the extrusion die. No special die design is required; however, the use of long lands from about ¼ to ½ inch is recommended in order to obtain maximum surface polish. No screens or breaker plates are required. As previously indicated, the land or straight exit portion of the extrusion die is preferably maintained at a temperature between about 140° F. and below the transition temperature range (i. e., 170–190° F.). However, it is also possible to maintain temperatures within the extrusion die which vary between about 70° F. and not higher than the uppermost limit of the transition temperature range. Also, as previously indicated, in some instances, temperatures above the transition temperature of the elastomeric material but below the temperature of substantial decomposition of the material (viz., about 450° F.) may also be employed, if there is no objection to obtaining an extruded profile having an unpolished surface. Even if temperatures appreciably above the transition temperature range of the elastomeric material are employed in the extrusion die itself, no perceptible thermal decomposition occurs. The reason that such thermal decomposition is prevented, is due to the short period of time which the elastomeric material is exposed to the land or exit end of the extrusion die, since only its surface approaches the temperature level of the die land, and this surface of the extruded section cools sufficiently upon leaving the extrusion die. In general, fairly high die land temperatures, within the aforementioned operating ranges, are preferred in order to heat-polish the surface of the extruded section. In order to maintain proper operating temperatures within the extrusion die itself, a die is employed equipped with a suitable heating unit 17, having adjustable temperature controls.

It will also be noted that the extrusion die 16, in a preferred modification, is so constructed that the entrance portion of this die, while being of approximately the same cross-section or diameter as the exit section of the extrusion chamber 11, is, however, larger in cross-section, preferably from 15 to 25 percent, than the exit section of the extrusion die. It will therefore be seen that extrusion die 16 is, preferably, a tapered die and is therefore particularly suited for maintaining pressure on the heated elastomeric material emerging from die 16. In general, these pressures will vary from approximately 500 to 2,000 pounds per square inch. It should be noted also, however, that any pressure may be employed which will not damage the equipment. Sufficient back-pressure is exerted so that pulsation is reduced to a minimum.

Inasmuch as the elastomeric copolymers of the present invention are easily discolored by foreign matter, the cylinder wall 15, screw 12, and the extrusion die 16, are preferably made of stainless steel to avoid any discoloration by process of corrosion, inasmuch as there may be a tendency at relatively higher operating temperatures to oxidize the construction materials. It is also advisable that the operator avoid handling the elastomeric copolymeric material, since organic matter in perspiration tends to discolor and darken the molding material upon being heated to elevated temperatures.

In starting a run with the elastomeric copolymeric material of the present invention, the heating elements in the extrusion molding machine should be adjusted to provide the minimum temperatures in the preferred ranges indicated above. The elastomeric material, either in the form of a raw rubbery crumb, or, in a preferred form, as a strip of compounded uncured stock containing suitable vulcanizing agents impregnated in the raw rubbery crumb, is introduced into the feed hopper 10 at a low screw-speed of approximately 10 to 15 R. P. M. When the molding operation is proceeding satisfactorily, as determined by the appearance of the extruded section, the screw speed and temperature may be increased, as required to attain the maximum production rate—the appearance of the extruded product determining the balance between these factors. In general, it is preferred to carry out the extrusion at the lowest temperature which is consistent with obtaining a satisfactorily polished product and a good production rate. A standard take-off mechanism may be employed with the extrusion molding apparatus. By following the procedure set forth above, it has been found possible to extrude the elastomeric copolymeric materials of the present invention into a variety of shapes and sizes to produce various articles of wide utility, which include tubing, hoses, beading, rods, bars, coated wires, etc.

Since certain changes may be made in carrying out the above method, and in the apparatus employed, without departing from the scope of the invention, it is intended that all matter contained in the above description shall be interpreted as illustrative and not in a limiting sense.

I claim:

1. In a process for shaping in an extrusion machine a material comprising an elastomeric copolymer of trifluorochloroethylene and vinylidene fluoride, the steps which comprise: heating said material to a temperature between about 70° F. and about 190° F. while moving said heated material through a die land at a temperature between about 70° F. and about 190° F.

2. In a process for shaping in an extrusion machine a material comprising an elastomeric copolymer of trifluorochloroethylene and vinylidene fluoride, the steps which comprise: heating said material to a temperature between about 100° F. and about 140° F. while moving said heated material through an extrusion chamber; and extruding said heated material through a die land at a temperature between about 70° F. and about 190° F.

3. In a process for shaping in an extrusion machine a material comprising an elastomeric copolymer of trifluorochloroethylene and vinylidene fluoride, the steps which comprise: heating said material to a temperature between about 100° F. and about 140° F. while moving said heated material through an extrusion chamber; and extruding said heated material through a die land at a temperature between about 140° F. and about 190° F.

4. In a process for shaping in an extrusion machine a material comprising an admixture of an elastomeric copolymer of trifluorochloroethylene and vinylidene fluoride and an agent capable of vulcanizing said copolymer, the steps which comprise: heating said material to a temperature between about 70° F. and about 190° F. while moving said heated material through an extrusion chamber; and extruding said heated material through a die land at a temperature between about 70° F. and about 190° F.

5. In a process for shaping in an extrusion machine a material comprising an admixture of an elastomeric copolymer of trifluorochloroethylene and vinylidene fluoride and an agent capable of vulcanizing said copolymer, the steps which comprise: heating said material to a temperature between about 100° F. and about 140° F. while moving said heated material through an extrusion chamber; and extruding said heated material through a die land at a temperature between about 70° F. and about 190° F.

6. In a process for shaping in an extrusion machine a material comprising an admixture of an elastomeric copolymer of trifluorochloroethylene and vinylidene fluoride and an agent capable of vulcanizing said copolymer, the steps which comprise: heating said material to a temperature between about 100° F. and about 140° F. while moving said heated material through an extrusion chamber; and extruding said heated material through a die land at a temperature between about 140° F. and about 190° F.

References Cited in the file of this patent

UNITED STATES PATENTS

| 2,705,706 | Dittman et al. | Apr. 5, 1955 |
| 2,736,064 | Rubin | Feb. 28, 1956 |

FOREIGN PATENTS

| 494,441 | Canada | July 14, 1953 |

OTHER REFERENCES

Maddock et al.: "Fluorothene Wire Insulation," Modern Plastics, December 1952, pp. 126, 128, 130, 186, 188, 190.

Conroy et al.: "Kel-F Elastomer," Rubber Age, January 1955, pp. 543, 550.